United States Patent
Torke

[11] 3,983,962
[45] Oct. 5, 1976

[54] FRAME MEMBERS FOR VEHICLES
[75] Inventor: Gernot Torke, Neu-Ulm, Germany
[73] Assignee: Volkswagenwerk Aktiengesellschaft, Germany
[22] Filed: June 2, 1975
[21] Appl. No.: 582,583

[30] Foreign Application Priority Data
June 20, 1974 Germany............................ 2429496

[52] U.S. Cl................................. 188/1 C; 293/70
[51] Int. Cl.² .......................................... F16F 7/12
[58] Field of Search...................... 74/492; 188/1 C; 293/70

[56] References Cited
UNITED STATES PATENTS
3,217,838 11/1965 Peterson et al. ..................... 188/1 C
3,831,997 8/1974 Myers ............................ 188/1 C X Primary Examiner—Duane A. Reger
Attorney, Agent, or Firm—Brumbaugh, Graves, Donohue & Raymond

[57] ABSTRACT

An elongate frame member for a vehicle comprises a strain-free annealed zone. When a compressive stress is applied to the frame member, corrugated deformations may be initiated in the strain-free annealed zone.

3 Claims, 3 Drawing Figures

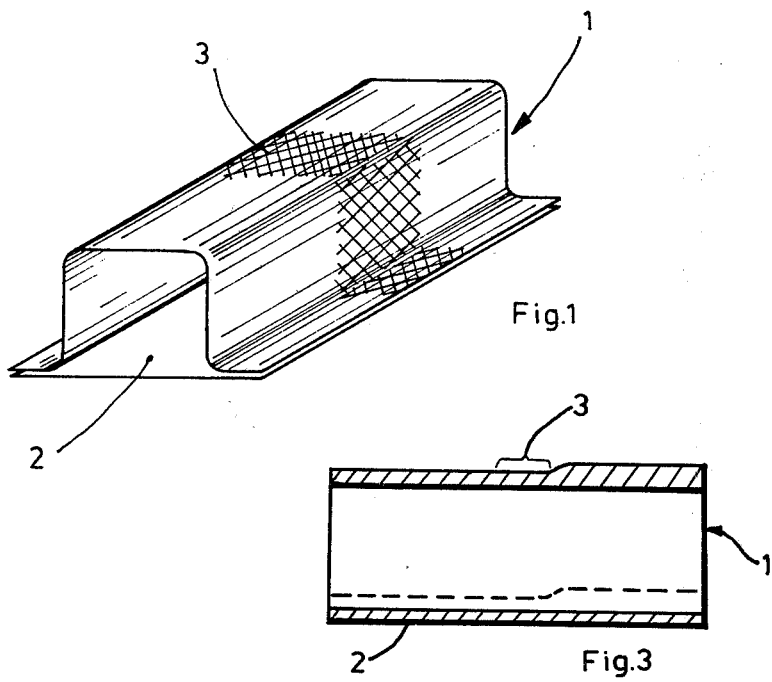
Fig.1
Fig.3
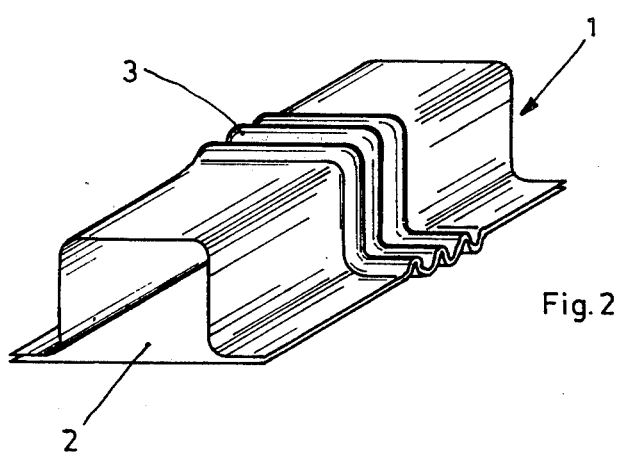
Fig.2

FRAME MEMBERS FOR VEHICLES

BACKGROUND OF THE INVENTION

The present invention relates essentially to a frame member for a vehicle which is capable of being deformed during a vehicular accident to dissipate the kinetic energy absorbed thereby.

Elongate frame members for vehicles are known which are capable of being compressed in the shape of corrugated deformations, when a predetermined minimum stress is applied to the frame members in an axial direction. During the deformation of the frame members, energy is dissipated serving to protect occupants of the vehicle during a collision or accident.

In order to achieve the desired dissipation of energy, frame members have been manufactured, in the past, with corrugations extending over a cross section of the frame members. However, the utilization of frame members having prefabricated corrugations is disadvantageous because the corrugations reduce the buckle-resistance of the frame members. Furthermore, the manufacture of corrugated frame members creates serious problems, since the corrugations extend perpendicular to the bending edges of the frame members. Thus, if the material forming the frame members is provided initially with the corrugations, the shaping of the material to form profiled frame members becomes more difficult. On the other hand, if the material forming the frame members is profiled initially, it becomes difficult to provide the profiled frame members with the corrugations.

SUMMARY OF THE INVENTION

It is an object of the present invention to provide an elongate frame member, of a type used as a longitudinal frame member for vehicles, which avoids the difficulties and disadvantages of the prior art frame members noted above.

This object, as well as other objects which will become apparent in the discussion that follows, are achieved, according to the present invention, by an elongate frame member for a vehicle which is capable of being longitudinally compressed to form corrugated deformations, when a compressive stress of a predetermined minimum value is axially applied to the frame member. In accordance with the present invention, the frame member is provided with a strain-free annealed zone for initiation of the deformation, which advantageously dissipates energy during a vehicular accident.

It has been found that when the material forming the frame member is shaped by noncutting methods, its hardness, and, hence, the hardness of the frame member, is increased. The present invention forms a strain-free or soft zone in the relatively hard frame member by means of strain-free or soft annealing. Thus, when a compressive stress of a predetermined minimum value is axially applied to the frame member, corrugated deformations may be formed in the strain-free annealed zone. Accordingly, it is possible to control the deformation of the frame member by means of thermal treatment.

In accordance with a preferred embodiment of the present invention, the strain-free annealed zone extends over an entire cross section of the frame member so that the frame member may be deformed precisely in an axial direction.

Multi-stage deformation by application of diverse axial minimum stresses may be achieved if the thickness or strength of the frame member, on either side of the strain-free annealed zone, is different. The gradation of the deformation may be further refined by forming several strain-free annealed zones and providing the frame member with different thicknesses or strengths on either side of the strain-free annealed zones.

BRIEF DESCRIPTION OF THE DRAWING

For a further understanding of the present invention, reference may be had to the accompanying drawing, in which:

FIG. 1 is a perspective view of a frame member of a vehicle showing a strain-free annealed zone prior to deformation;

FIG. 2 is a perspective view of the frame member of FIG. 1 after deformation; and FIG. 3 is an axial cross-sectional view of a frame member similar in configuration to the frame member of FIG. 1, but having different thicknesses on either side of a strain-free annealed zone, the view being taken generally along a vertical plane.

DESCRIPTION OF THE PREFERRED EMBODIMENTS

The preferred embodiments of the present invention will now be described with reference to FIGS. 1–3 of the drawing. Identical elements in the various figures will be designated by the same reference numerals.

Referring now to the drawing, there is shown a frame member for a vehicle comprising a U-shaped channel section 1 and a cover 2. At least the U-shaped channel section 1 is provided with a strain-free annealed zone 3. When a predetermined minimum stress is axially applied to the frame member, corrugated deformations are initiated in the strain-free annealed zone 3 (see FIG. 2) resulting in the dissipation of energy. As the stress increases, the deformation will continue in both directions along the longitudinal axis of the frame member, starting from the strain-free annealed zone 3, if the thickness or strength of the frame member is equal on both sides of the strain-free annealed zone 3.

Thus, the frame member of the present invention is manufactured with a smooth surface, rather than a corrugated surface, thereby eliminating the necessity of providing special machines to form the desired corrugations. Moreover, by manufacturing a frame member with a smooth surface, the present invention permits the controlled deformation of the frame member without disadvantageously reducing the buckle-resistance of the frame member.

Referring now to FIG. 3, there is shown an alternate embodiment of the present invention. As shown in that figure, a multi-stage deformation may be achieved if the thickness of at least the U-shaped channel section 1 is different on both sides of the strain-free annealed zone 3.

It will be understood that the above-described embodiments are merely exemplary and that persons skilled in the art may make many variations and modifications without departing from the spirit and scope of the invention. For example, the gradation of the deformation may be further refined by providing several strain-free annealed zones, the thickness of the frame member being different on either side of the strain-free annealed zones. All such modifications and variations are intended to be included within the scope of the invention as defined in the appended claims.

I claim:

1. An elongate frame member for a vehicle capable of being longitudinally compressed to form corrugated deformations when a compressive stress of a predetermined value is axially applied to the frame member, comprising a strain-free annealed zone for initiation of the deformation.

2. The frame member of claim 1, wherein the strain-free annealed zone extends over an entire cross section of the frame member.

3. The frame member of claim 1, wherein the thickness of the frame member on either side of the strain-free annealed zone is different.

* * * * *